United States Patent
Lecolier et al.

(10) Patent No.: US 10,738,601 B2
(45) Date of Patent: Aug. 11, 2020

(54) PROCESS FOR DEVELOPING A SUBTERRANEAN FORMATION BY INJECTION OF A FLUID COMPRISING AN ADDITIVE LABELLED WITH A LUMINESCENT SEMICONDUCTING NANOCRYSTAL

(71) Applicant: IFP Energies nouvelles, Rueil-Malmaison (FR)

(72) Inventors: Eric Lecolier, Chaville (FR); Patrick Gateau, Maurepas (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 304 days.

(21) Appl. No.: 15/575,666

(22) PCT Filed: Apr. 22, 2016

(86) PCT No.: PCT/EP2016/059045
§ 371 (c)(1),
(2) Date: Nov. 20, 2017

(87) PCT Pub. No.: WO2016/184640
PCT Pub. Date: Nov. 24, 2016

(65) Prior Publication Data
US 2018/0283173 A1    Oct. 4, 2018

(30) Foreign Application Priority Data

May 21, 2015   (FR) ...................... 15 54561

(51) Int. Cl.
| | |
|---|---|
| *E21B 49/00* | (2006.01) |
| *E21B 47/10* | (2012.01) |
| *C09K 11/08* | (2006.01) |
| *C09K 8/03* | (2006.01) |
| *C09K 8/035* | (2006.01) |
| *E21B 21/06* | (2006.01) |
| *E21B 37/06* | (2006.01) |
| *E21B 41/02* | (2006.01) |
| *E21B 43/16* | (2006.01) |
| *E21B 43/25* | (2006.01) |

(52) U.S. Cl.
CPC .............. *E21B 49/008* (2013.01); *C09K 8/03* (2013.01); *C09K 8/032* (2013.01); *C09K 8/035* (2013.01); *C09K 11/08* (2013.01); *E21B 47/1015* (2013.01); *C09K 2208/10* (2013.01); *C09K 2208/22* (2013.01); *C09K 2208/32* (2013.01); *E21B 21/062* (2013.01); *E21B 37/06* (2013.01); *E21B 41/02* (2013.01); *E21B 43/16* (2013.01); *E21B 43/25* (2013.01)

(58) Field of Classification Search
CPC ............... E21B 47/1015; E21B 47/102; C09K 2208/10; C09K 8/03; C09K 11/06; C09K 11/883
See application file for complete search history.

(56) References Cited

U.S. PATENT DOCUMENTS

| | | | |
|---|---|---|---|
| 7,384,795 B2* | 6/2008 | Lagwinski ............. | B82Y 15/00 436/180 |
| 2011/0214488 A1* | 9/2011 | Rose ................... | E21B 47/1015 73/61.71 |
| 2011/0277996 A1* | 11/2011 | Cullick ................ | E21B 33/138 166/250.12 |
| 2012/0318503 A1 | 12/2012 | Kanj et al. | |
| 2013/0084643 A1 | 4/2013 | Commarieu et al. | |
| 2013/0109100 A1* | 5/2013 | Sarkar ..................... | C09K 8/03 436/27 |
| 2014/0116778 A1* | 5/2014 | Deville ................... | C09K 8/03 175/42 |
| 2014/0124196 A1* | 5/2014 | Sunde .................. | E21B 47/1015 166/250.12 |
| 2015/0090456 A1* | 4/2015 | Turkenburg ............ | G01V 9/00 166/305.1 |
| 2016/0168952 A1* | 6/2016 | Qu ......................... | C09K 8/524 356/316 |

(Continued)

FOREIGN PATENT DOCUMENTS

| | | |
|---|---|---|
| WO | 2011/076874 A1 | 6/2011 |
| WO | 2011/109782 A1 | 9/2011 |
| WO | 2012/158478 A1 | 11/2012 |

OTHER PUBLICATIONS

International Search Report for PCT/EP2016/059045, dated May 18, 2016; English translation submitted herewith (7 pgs.).
Peter Rose et al: "Quantum Dots as Tracers in Geothermal and EGS Reservoirs", 36th Workshop on Geothermal Reservoir Engineering 2011: Stanford, California, USA, Jan. 31-Feb. 2, 2011, Curran, US.
M. Bruchez et al: "Semiconductor nanocrystals as fluorescent biological labels SCLM References and Notes", Science, vol. 281, Sep. 25, 1998.

*Primary Examiner* — Kipp C Wallace

(74) *Attorney, Agent, or Firm* — Fitch, Even, Tabin & Flannery, LLP

(57) ABSTRACT

The present invention concerns a process for developing a subterranean formation, in which at least one fluid is injected. In accordance with the invention, the fluid comprises at least one additive, the additive being labelled with at least one luminescent semiconductor nanocrystal (fluorescent or phosphorescent). In this manner, and by optical analysis of the presence of luminescent semiconductor nanocrystal in the fluid recovered from the subterranean formation, the presence and/or quantity of additive in the recovered fluid can be determined. Given that the semiconductor nanocrystal is either phosphorescent or fluorescent, the additive is rendered readily detectable and quantitatively determinable in the fluids recovered from the subterranean formation.

11 Claims, No Drawings

(56) References Cited

U.S. PATENT DOCUMENTS

2017/0097443 A1\* 4/2017 Bernstein ................ E21B 43/16
2017/0122078 A1\* 5/2017 Qu ........................... C09K 8/54

\* cited by examiner

PROCESS FOR DEVELOPING A SUBTERRANEAN FORMATION BY INJECTION OF A FLUID COMPRISING AN ADDITIVE LABELLED WITH A LUMINESCENT SEMICONDUCTING NANOCRYSTAL

CROSS-REFERENCE TO RELATED APPLICATIONS

This application is a U.S. national phase application filed under 35 U.S.C. § 371 of International Application No. PCT/EP2016/059045, filed Apr. 22, 2016, designating the United States, which claims priority from French Patent Application No. 15/54.561, filed May 21, 2015, which are hereby incorporated herein by reference in their entirety.

The present invention relates to the field of exploration and developing a subterranean formation. More particularly, the invention relates to determining the properties of a subterranean formation and detecting and analysing the composition of a fluid recovered from the subterranean formation.

The invention also relates to the field of enhanced oil recovery (EOR), to the field of the treatment of production water, to the field of oil drilling, to the field of source rock oil and/or gas production, to the field of the treatment of subterranean formations, etc.

Methods have been developed to determine the properties of a subterranean formation such as the petrophysical properties (permeability, porosity), the identification of preferential channels or preferential connections, etc. Knowledge of these properties can in particular be used to adapt the processes for developing the subterranean formation such as enhanced recovery, and processes for the production of source rock oil and gas. These processes are essentially based on the injection of elements, for example radioactive elements, into the subterranean formation and observing their behaviour (adsorption, channelling, transit time, etc.). However, these processes do not provide the desired information in a reliable manner, because the elements which are introduced do not behave in the same manner as the fluid with the additive which is subsequently injected into the subterranean formation, in particular in their distinct chemical form and their differing adsorptions and velocities. Furthermore, the use of radioactive elements is subject to considerable constraints for these methods.

In order to explore and develop a subterranean formation, a fluid is routinely injected into the subterranean formation in order to increase the efficiency of the processes. In order to optimize these processes, at least one additive is routinely included in the injected fluid. This additive can take the form of organic molecules such as polymers, copolymers and/or surfactants, etc. It may also take the form of inorganic molecules such as minerals (clays, barite, etc), oxide particles (titanium oxides, iron oxides, etc), etc. Although the method is improved, adding additive(s) poses certain problems primarily linked to pollution of the subterranean formation by the additive, to pollution of the water contained in the subterranean formation by the additive, and to pollution by the additive of the water and/or to the hydrocarbons produced, etc. It is thus necessary to monitor the behaviour of the additive in the subterranean formation.

For enhanced oil recovery, it is advantageous to know whether the additive used, in general polymers, copolymers and surfactants, is found in the water produced and, if yes, then to know its concentration in order to carry out a suitable treatment of the water.

To drill a well, a fluid is injected which fulfils four functions, namely: lifting the rock cuttings, keeping the cuttings in suspension when circulation stoppages occur, maintaining the pore pressure above the formation as well as cooling and lubricating the drilling tool. The drilling fluid contains several additives in order to fulfil these four functions, such as viscosifying agents, lubricants, anti-foaming agents, fluid loss control agents, etc. The dose of each of the additives for the drilling fluid formulation is optimized so that this formulation has the desired properties. The additives may be either organic molecules such as polymers, copolymers, associative polymers, or surfactants, or inorganic particles (clays, barite, etc). However, a variation in the concentration of additive(s) results in the drilling fluid no longer fulfilling the functions mentioned above. On the drilling platform, an individual is tasked with constantly checking that the drilling fluid properties comply with the initial specifications. In this regard, it may be of advantage to provide a method which can instantaneously determine, even in-line, the concentration of certain additives contained in the drilling fluid once it has been lifted to the surface. Knowing this information would mean that the concentration of additives in the drilling fluid formulation could be adjusted in real time: this then has a constant composition, and thus will permanently have the desired properties for the drilling which is being carried out. This practice could contribute to ensuring safety during drilling and make it more economical (by always operating under the best drilling conditions).

Furthermore, for the production of source rock oil and/or gas, it may in particular be advantageous to check that the additives (for example polymers) for the fracturing fluid do not appear in one or more aquifer(s), or ground water located above the subterranean formation being developed. For the purposes of control and monitoring fracturing operations, it may be advantageous to determine the quantity of certain additives used in the fracturing fluids left in the fractures generated in the source rock: to this end, it may be useful to measure the concentration of the additive(s) for the fracturing fluids before fracturing and their concentration after fracturing (once these have been retrieved).

Another desirable application is monitoring the injection of anti-hydrate additives or anti-scale additives, or anti-corrosion additives.

There are no current processes which can be used for monitoring which are efficient and simple to implement for the injection of additive(s) into the subterranean formation. In fact, the additives used are not easily and rapidly detectable in the fluids recovered from the subterranean formation. In addition, it is not possible to use the additive or additives present in the fluids as tracers and also to allow the injection of fluids into the subterranean formation to be monitored and supervised. Similarly, the detection and determination of additive(s) in the fluids produced at the surface (production water, hydrocarbons, drilling fluids, fracturing fluids, EOR fluids, etc) is lengthy and complicated because of the multitude of interferences due to the presence of numerous compounds present in the fluids recovered at the surface. In order to arrive at measuring the concentration of the additive or additive(s) in the fluids produced at the surface, it is necessary to employ several steps to separate, extract the desired additive(s); however, this process is very lengthy and cannot be used to obtain the envisaged result.

In order to overcome these problems, the present invention concerns a process for developing a subterranean formation, in which at least one fluid is injected. In accordance with the invention, the fluid comprises at least one additive, the additive being labelled with at least one luminescent semiconductor nanocrystal (fluorescent or phosphorescent).

In this manner, and by optical analysis of the presence of luminescent semiconductor nanocrystal in the fluid recovered from the subterranean formation, the presence and/or the quantity of additive in the recovered fluid can be determined. Given that the semiconductor nanocrystal is either phosphorescent or fluorescent, the additive is rendered readily detectable and quantitatively determinable (in particular when the additive is labelled with at least one fluorescent semiconductor nanocrystal) in the fluids recovered from the subterranean formation.

The Process in Accordance with the Invention

The invention concerns a process for developing a subterranean formation, in which at least one fluid is injected into said subterranean formation, said injected fluid comprising at least one additive. In this process, the following steps are carried out:
 a) at least one additive is labelled with a luminescent semiconductor nanocrystal;
 b) said fluid comprising said labelled additive is injected into said subterranean formation;
 c) at least one fluid is recovered from said subterranean formation; and
 d) the presence and/or quantity of said additive labelled with said luminescent semiconductor nanocrystal in said recovered fluid is optically analysed.

In accordance with the invention, said additive is labelled with said luminescent semiconductor nanocrystal by grafting said luminescent semiconductor nanocrystal onto said additive, or by incorporating said luminescent semiconductor nanocrystal into the structure of said additive, or by coating said additive with said luminescent semiconductor nanocrystal in a coating layer.

In accordance with one embodiment of the invention, said luminescent semiconductor nanocrystal comprises a material selected from zinc sulphide (ZnS), zinc oxide (ZnO), cadmium sulphide (CdS), zinc selenide (ZnSe), cadmium sulphide (CdS), cadmium selenide (CdSe), cadmium telluride (CdTe), lead sulphide (PbS), lead telluride (PbTe), lead selenide (PbSe), $CuInSe_2$, $CuInS_2$, CdSeTe, CdHgTe, and $ZnS/Zn_{1-x}Cd_xS$, zinc sulphide doped with manganese (ZnS:Mn), zinc sulphide doped with europium (ZnS:Eu), calcium sulphide doped with europium (CaS:Eu), strontium sulphide doped with europium (SrS:Eu), strontium sulphide doped with europium and dysprosium (SrS:Eu,Dy), and strontium sulphide doped with europium and copper (SrS:Eu,Cu).

In accordance with a variation, said luminescent semiconductor nanocrystal is in the form of a semiconductor core coated with at least one semiconductor shell.

Advantageously, said luminescent semiconductor nanocrystal is in the form of a multi-shell nanocrystal the composition of which is selected from CdSe/CdS/ZnS, CdSe/ZnSe/ZnS and InP/ZnS.

In accordance with one feature of the invention, said luminescent semiconductor nanocrystal is composed of three atomic elements belonging to columns I, III and VI of the periodic table.

Preferably, the composition of said luminescent semiconductor nanocrystal is selected from zinc sulphide doped with manganese (ZnS:Mn) and zinc sulphide doped with europium (ZnS:Eu).

Advantageously, said luminescent semiconductor nanocrystal is substantially spherical, nanocylindrical or nanoplatelet in shape.

In a variation, said additive is an organic compound such as a polymer, a copolymer or a surfactant.

Alternatively, said additive is an inorganic compound such as a clay mineral, barite or a metallic oxide.

In an alternative, said additive is an anti-scale additive or an anti-corrosion additive or an anti-hydrate additive.

In accordance with one embodiment, said recovered fluid is a production effluent from said subterranean formation comprising hydrocarbons.

Alternatively, said recovered fluid is a fluid removed from an aquifer of said subterranean formation.

In a variation, said recovered fluid is a drilling fluid.

Advantageously, at least one fluid with an additive is injected into a subterranean formation by means of at least two wells and in which, for each well, said additive used is labelled with a luminescent semiconductor nanocrystal emitting at a distinct wavelength, in order to determine the provenance of the additive present in said recovered fluid.

Furthermore, the invention concerns a process for determining at least one property of a subterranean formation, in which the development process in accordance with one of the preceding features is implemented in order to determine said property of the subterranean formation by means of said analysis.

Advantageously, the development process is an enhanced oil recovery process or a process for the production of source rock oil and/or gas.

Preferably, said property of the subterranean formation is selected from a petrophysical property, an identification of preferential channels, an identification of preferential connections between the wells of said subterranean formation, the detection of a leak during the development of source rock oils and/or gas.

In addition, the invention concerns a process for optimizing the development of a subterranean formation, in which the development process in accordance with one of the preceding features is implemented in order to detect and/or quantify the presence of additive in said recovered fluid, said process comprising a step for adapting said injected fluid and/or a step for treatment of said recovered fluid as a function of the presence and/or the quantity of additive in said recovered fluid.

In accordance with one embodiment of the invention, the treatment step is a step for treatment of the water produced by an enhanced oil recovery process as a function of the quantity of additive present in the water produced.

In accordance with a variation, the adaptation step is a step for adjusting the additives in a drilling fluid injected into said subterranean formation, the adjustment being a function of the quantity of additive present in the surface fluid lifted to the surface.

In accordance with one feature of the invention, the adaptation step is a step for adjusting the additives in a fracturing fluid injected into said subterranean formation, the adjustment being a function of the quantity of additive present in the fluid produced.

Advantageously, the adaptation step is a step for adjusting the anti-scale and/or anti-hydrate and/or anti-corrosion additives in an injected fluid, the adjustment being a function of the quantity of additive present in the fluid produced.

Preferentially, the adaptation step is a step for adjusting the additives in an enhanced oil recovery fluid, the adjustment being a function of the quantity of additive present in the fluid produced.

DETAILED DESCRIPTION OF THE INVENTION

The present invention concerns a process for developing a subterranean formation, in which at least one fluid is injected, the fluid comprising at least one additive. In the process in accordance with the invention, the following steps are carried out:
1) labelling the additive
2) injecting fluid
3) recovering a fluid from the subterranean formation
4) optical analysis The injected fluid may be an aqueous fluid or an organic solvent. It may be a drilling fluid, water, a fracturing fluid, an enhanced oil recovery fluid, etc.

The additive for the injected fluid may take the form of organic molecules such as polymers, copolymers (for example polyacrylamide) and/or surfactants, etc. It may also take the form of inorganic compounds such as minerals (clays, barite, etc) or oxides (titanium oxides, iron oxides, etc).

The term "recovered fluid" in particular means complex fluids comprising, alone or as a mixture, production water, hydrocarbons, drilling fluids, fracturing fluids, geological formation water, etc. The term "produced fluid" designates a complex fluid comprising, alone or in combination, production water and hydrocarbons, which may be recovered via a production well.

1) Labelling the Additive

During this step, the additive is labelled with a luminescent semiconductor nanocrystal (fluorescent or phosphorescent). A semiconductor nanocrystal is also termed a quantum dot. A semiconductor nanocrystal is a nanostructured semiconductor material(s). Depending on its size and its characteristics, it behaves as a potential well which confines electrons (and holes) in three dimensions in space in a region with a size of the order of the wavelength of the electrons (de Broglie wavelength), i.e. a few tens of nanometres in a semiconductor. Semiconductor nanocrystals (or nanoparticles) are objects with a size which is typically in the range 2 to 20 nm; these nanoparticles comprise approximately 100 to 10000 atoms. Because of their very small size, the semiconductor nanocrystals have very specific optical properties due to the atypical behaviour of the electrons because of their confinement in these semiconductor nanocrystals. Thus, quantum dots are known and renowned for their luminescence. Certain semiconductor nanocrystals fluoresce at very narrow wavelengths (the width at mid-height of the emission peak is typically 30 nm). Other semiconductor nanocrystals are known to be phosphorescent. The quantum dots may emit in the ultraviolet, the visible, the near infrared and the infrared. In addition, their absorption spectrum is very broad: thus, they can be excited with radiation of different wavelengths. Luminescent nanocrystal quantum dots have the advantage of being very bright when they emit their light: thus, they can be used in small quantities, in contrast to organic fluorophores, which have a weaker light intensity.

Thus, the fluorescence and phosphorescence characteristics of semiconductor nanocrystals mean that they can be used as a tracer, as they can easily be detected.

In addition, other fluorescent organic molecules, used in particular in the field of medical imagery (for example fluorescein isothiocyanate), lose their excitation fluorescent property over time: this phenomenon is known as photobleaching. This rapid decrease in the fluorescence of organic fluorphores over time is too great a limitation to envisage them being used in the context of the invention. In contrast, luminescent semiconductor nanocrystals resist photobleaching extremely well.

The advantage of quantum dots also resides in the fact that it is possible to control their optical properties by modifying their size, their shape, their chemical compositions (for example by incorporating into them specific atomic elements which are generally known as dopants), and their surface properties. As an example, non-spherical quantum dots, i.e. which are cylindrical in shape or in the form of platelets, have the advantage over spherical quantum dots of emitting polarized light: this property may be a supplemental advantage for detecting and identifying the additives (organic, inorganic molecules) which are to be detected in the development process of the invention more easily.

There are different types of luminescent semiconductor nanocrystals; in particular (this list is not limiting):

1. Fluorescent semiconductor nanocrystals (which emit a light signal when they are illuminated by electromagnetic radiation) can be distinguished. The following examples of fluorescent semiconductor nanocrystals may be cited:

fluorescent semiconductor nanocrystals can exist in the form of fluorescent semiconductor nanocrystals which are pure and constituted by a single atomic element belonging to column IV of the periodic table (such as silicon or germanium).

Type II-VI semiconductor nanocrystals (so named because of their electron structure) are interesting from the point of view of their optical properties, in particular fluorescence. These semiconductors (which associate one or more anions with one or more cations) include the following:

zinc sulphide (ZnS), zinc oxide (ZnO), which emit in the ultraviolet, as well as cadmium sulphide (CdS).

zinc selenide (ZnSe), cadmium sulphide (CdS), cadmium selenide (CdSe), cadmium telluride (CdTe), lead sulphide (PbS), which emit over a spectrum ranging from the ultraviolet to the infrared, passing through the visible.

lead telluride (PbTe), lead selenide (PbSe), for the infrared.

The fluorescent semiconductor nanocrystals may also be in the form of a semiconductor core coated in a shell which is itself semiconducting. This shell can be used to protect the core (for example from oxidation, and/or from leaching caused by the fluids in which the semiconductor nanocrystals are caused to circulate or dwell) and to improve the quantum yields (i.e. the quality of the fluorescence). These single-shell semiconductor nanocrystals principally include:

a core of cadmium selenide (CdSe) coated in a shell of zinc (Zn) and sulphur (S): CdSe/ZnS other possible examples: CdSe/ZnSe, CdSe/CdS, InP/ZnS, etc.

The fluorescent semiconductor nanocrystals also exist in the form of a core coated with several shells: these are known as multi-shell quantum dots. These quantum dots have the advantages of being less fragile as regards the shell (and thus protecting the core better), and of having the highest quantum yields (of the order of 80% to 90%). Examples of quantum dots of this type are, for example:

CdSe/CdS/Zns

CdSe/ZnSe/Zns

The fluorescent semiconductor nanocrystals may also be composed of three atomic elements from columns I, III and VI of the periodic table. Examples of semiconductor nanocrystals of this type are:
CuInSe$_2$
CuInS$_2$
CdSeTe
CdHgTe
ZnS/Zn$_{1-x}$Cd$_x$S 2. Phosphorescent semiconductor nanocrystals (which emit a light signal for a certain period after having been illuminated by an electromagnetic radiation) can also be distinguished. The following semiconductor nanocrystals may be cited by way of example:
zinc sulphide doped with manganese (ZnS:Mn)
zinc sulphide doped with europium (ZnS:Eu)
calcium sulphide doped with europium (CaS:Eu)
strontium sulphide doped with europium (SrS:Eu)
strontium sulphide doped with europium and dysprosium (SrS:Eu,Dy)
strontium sulphide doped with europium and copper (SrS:Eu,Cu)

In accordance with one embodiment of the invention, phosphorescent semiconductor nanocrystals may be used in order to detect them. In addition, luminescent nanocrystals may be used for detection and quantitative measurement thereof.

The luminescent semiconductor nanocrystals do not exist solely in the spherical form. It is possible to synthesize semiconductor nanocrystals in the form of nanocylinders composed, for example, of CdSe or luminescent nanoplatelets. Examples are certain compounds of the lanthanide oxysulphide family, i.e. with general formula Ln$_2$O$_2$S where Ln represents an element from the lanthanide family (such as lanthanum (La), gadolinium (Gd) etc). Compounds with general formula Ln$_2$O$_2$S have a lamellar structure. Thus, it is possible to synthesize fluorescent nanoplatelets having compositions such as, for example, (Na,La)$_2$O$_2$S:Tb, in which the lanthanide used is terbium (the percentage being 1%), or (Na, La)$_2$O$_2$S:Eu, in which the lanthanide used is europium (the percentage being 4%). In each of these examples, the lanthanide oxysulphide is doped with sodium (Na).

Any of the luminescent semiconductor nanocrystal families described above are suitable for the process in accordance with the invention.

Preferably, in the process in accordance with the invention, semiconductor nanocrystals with the best quantum yields are used, such as multi-shell quantum dots of the CdSe/CdS/Zns or CdSe/ZnSe/Zns type and quantum dots with shell(s) which do not incorporate toxic elements (cadmium), such as InP/ZnS quantum dots.

This step of the process in accordance with the invention consists of labelling at least one additive with at least one luminescent semiconductor nanocrystal, the additives being those used in the oil industry, which may have a variety of chemical natures. This labelling may be carried out either by (chemical) grafting to the additives (for example in the case of polymers, copolymers, monocatenary bicatenary surfactants, polymers or surfactants, or any organic molecule itself grafted to a clay or any other mineral), or by incorporation directly into the structure of the additives (for example in the case of inorganic additives such as silica, proppants), barite, etc) or by coating the additives and the semiconductor nanocrystals with another material (for example coating solid fillers and semiconductor nanocrystals with a layer of silica or a layer of latex).

There are various possibilities as regards labelling the additives with luminescent semiconductor nanocrystals. These various labelling techniques (described in the literature) and adapted to the process in accordance with the invention are listed below in a non-exhaustive manner:
coupling by electrostatic attraction,
coupling by bi-functionalizing the additive (polymer, surfactant, etc) and the quantum dot (QD). As an example:
QD-S—CH$_2$—CO—NH-additive,
coupling by hydrophobic attraction between hydrophobic groups of the additive and hydrophobic groups on the surface of the quantum dots,
coupling by an oxolation reaction between two M-OH groups, one present on the surface of a quantum dot (QD) and the other being present on the additive to be labelled, where M is a metal (for example Al, Si, etc):
Si—OH$_{QD}$+Si—OH$_{additive}$→Si$_{QD}$—O—Si$_{additive}$
Al—OH$_{QD}$+Al—OH$_{additive}$→Al$_{QD}$—O—Al$_{additive}$
coupling via the olation reaction, which may occur when a molecule of water exists on a complex surface group, either the quantum dot or the additive:
M$_{QD}$-OH+M$_{additive}$-OH$_2$→M$_{QD}$-OH-M$_{additive}$+H$_2$O
M$_{additive}$-OH+M$_{QD}$-OH$_2$→M$_{QD}$-OH-M$_{additive}$+H$_2$O
M designates a metal (for example Al, Si, etc)
coupling via the alkoxylation reaction,
coupling via polysialate oligomers the chemical formulae for which are shown below. These polysialate oligomers act as a bridge between one or more quantum dots and the additives to be labelled.

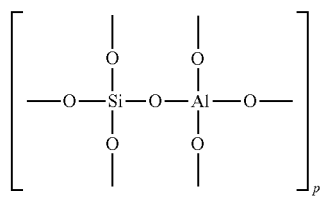

Poly(sialate)

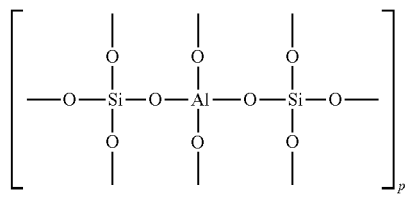

Poly(sialate-siloxo)

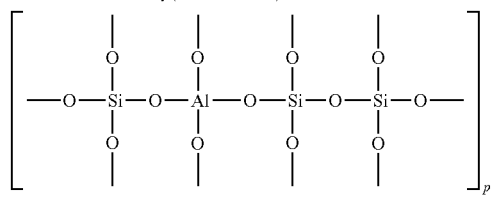

Poly(sialate-disiloxo)

Coupling via the last three reactions described above is of particular interest when grafting quantum dots onto minerals such as clays, which are aluminosilicates with colloidal dimensions in which Al—OH and/or Si—OH are known to exist at the periphery of the particles.

In order to "attach" the quantum dots to the additives, it should be noted that the most effective processes described above involve functionalizing the quantum dots; the functionalization consists of modifying the surface quality of the quantum dots by grafting chemical groups which can be used to establish a bond with the chemical groups of the additive to be labelled. Functionalization processes have been well known since the end of the 1990s. The following articles describe these processes:

Bruchez Jr. M., Moronne M., Gin P., Weiss S., Alivisatos A. P., 1998, Semiconductor nanocrystals as fluorescent biological labels, Science.

Chan W. C. W., Nie S., 1998, Quantum dot bioconjugates for ultrasensitive nonisotopic detection, Science.

The functionalization may consist of grafting organic ligands to the surface of quantum dots, or by coating them with a shell of a polymer (or copolymer) having the desired properties (for example hydrophilicity for uses in aqueous media or, in contrast, hydrophobicity for uses in organic solvents). The ligands may, for example, be amine, carboxyl, amide, thiol, etc groups.

Furthermore, the document: Bach L. G., Islam Md R., Hong S. S., Lim K. T., 2013, A simple preparation of a stable CdS-polyacrylamide nanocomposite: Structure, thermal and optical properties, J. Nanosci. Nanotechnol, describes a process for grafting a quantum dot onto a polyacrylamide.

Furthermore, the document: Jeong J., Kwon E.-K., Cheong T.-C., Park H., Cho N.-H., Kim W., 2014, Synthesis of multifunctional Fe3O4-CdSe/ZnS nanoclusters coated with lipid A; toward dendritic cell-based immunotherapy, Applied Materials and Interfaces, shows that it is possible to attach quantum dots to compounds other than organic compounds, for example to iron oxide nanoparticles.

The fluorescent semiconductor nanocrystals have an excellent fluorescence emission: the quantum yield (which is equal to the ratio of the number of photons emitted over the number of photons absorbed) is large and much higher than the fluorescent organic molecules which are already known. In addition, concentrations of semiconductor nanocrystals which are as low as a few parts per billion (ppb) are sufficient to measure a fluorescence signal. The measurements will be even more reliable for concentrations exceeding a few parts per million (ppm). The number of nanocrystals grafted onto the additive depends on a number of parameters, such as the chemical nature of the additive (polymer, clay, etc), the concentration of additive in the injected fluid, the properties of the injected fluids or the effluents. In addition, as a function of the envisaged application, it is possible to graft onto the additives to be detected the number of fluorescent nanocrystals such that the final concentration of nanocrystals is correct for measuring a fluorescence signal, and to quantify the additive content in the complex fluid being monitored. In the case in which it is only desired to detect the presence of an additive labelled with at least one phosphorescent semiconductor nanocrystal, the level of concentration which is required follows the same reasoning as that mentioned for fluorescent semiconductor nanocrystals.

The injected fluid may comprise a single additive, which is then labelled. Alternatively, the injected fluid may comprise a plurality of additives, only one additive of which being labelled, for example the additive which is the worst pollutant and which has to be monitored, or the additive which runs the risk of being found in the fluid which is recovered first. In the case in which the behaviour of several additives in the subterranean formation has to be analysed, several additives may be labelled. Labelling these various additives may be carried out by grafting fluorescent semiconductor nanocrystals of different sizes which fluoresce at different emitted wavelengths, so as to distinguish the various additives during the optical analysis and/or by grafting phosphorescent semiconductor nanocrystals.

2) Injection of Fluid

The fluid prepared with the labelled additive is injected into the subterranean formation. The fluid may be injected into a subterranean formation using any process known in the oil industry field. It may in particular be an injection of a fluid into an injection well using a pumping system.

3) Recovery of a Fluid

This step consists of recovering a fluid, known as the recovered fluid, from the subterranean formation, which is then used in the subsequent analysis step. The recovered fluid comprises complex fluids comprising, alone or as a mixture, at least one of the hydrocarbons produced by a production well, or water produced by a production well, or water removed from the subterranean formation, in particular water removed from an aquifer of the subterranean formation, or a drilling fluid lifted to the surface during the drilling operation, etc.

4) Optical Analysis

During this step, the recovered fluid is analysed so as to determine the presence (or absence) and/or the quantity of luminescent semiconductor nanocrystals in the recovered fluid. The presence, absence and/or the quantity of semiconductor nanocrystals in the recovered fluid means that the presence, absence and/or the quantity of additives in the recovered fluid can be determined. In fact, the additives are readily detectable because of the fluorescence and/or phosphorescence properties of the luminescent semiconductor nanocrystals labelling the additive.

In accordance with one embodiment of the invention, the presence of additives may be detected using phosphorescent semiconductor nanocrystals.

In accordance with one embodiment of the invention, the detection of the presence of additives and the measurement of the quantity of additives may be carried out by means of luminescent semiconductor nanocrystals.

The analysis of the recovered fluid may consist of an optical analysis such as fluorescence spectroscopy, which measures the wavelength emitted by the semiconductor nanocrystals when they are excited by an incident radiation, or any apparatus which can be used to measure and quantify the fluorescence. The additive present in the effluent can be deduced from this wavelength.

The analysis of the recovered fluid may also consist of detecting the phosphorescence of phosphorescent semiconductor nanocrystals after they have been illuminated by electromagnetic radiation. The phosphorescence may be analysed using a spectrofluorometer.

In accordance with one embodiment of the invention, the optical analysis may be carried out using an illumination (excitation by luminous radiation) and detection of the wavelengths emitted by the illuminated recovered fluid.

Thanks to this analysis, it is possible to continuously determine, in real time, the presence and/or the quantity of additive(s) in the recovered fluids.

In accordance with one embodiment of the invention, the development process comprises injecting at least one fluid with an additive into a subterranean formation by means of at least two wells. For each well, the additive used is labelled with a luminescent semiconductor nanocrystal emitting at a distinct wavelength, in order to determine the provenance of the additive present in the recovered fluid. Hence, in an enhanced recovery process, in accordance with one exemplary embodiment of the invention, it is possible to determine which is the most direct channel between an injection well and a production well. In a process for the production of source rock oil and/or gas, in accordance with one embodiment, it is possible to determine which is the injection well which is at the origin of a leak in an aquifer.

Applications of the Process

The process for developing a subterranean formation in accordance with the invention may be applied to any process in which a fluid, which comprises additives, is injected into a subterranean formation, in particular for processes for exploring and developing a subterranean formation. In particular, the development process in accordance with the invention may be used in an enhanced oil recovery process, a process for the treatment of the water produced, a drilling process, a process for the production of source rock oils and/or gas, etc.

Before describing two applications of the process in accordance with the invention, various processes for exploring and developing a subterranean formation will be briefly described. However, the process in accordance with the invention is not limited to the applications described.

Enhanced Oil Recovery (EOR) Process

At the start of developing an oil reservoir, the pressure prevailing in the field is sufficient to produce hydrocarbons in situ. However, over time, the pressure in the reservoir falls and is no longer sufficient to expel the oil from the rock reservoir. After this primary recovery, it becomes necessary to compensate for this drop in pressure by injecting either water or gas into the reservoir. This production step bears the name "secondary recovery", but the percentage recovery of hydrocarbons in situ flattens out at 30%. The oil industry has developed enhanced oil recovery techniques (EOR). These techniques, known as tertiary recovery, are intended to modify the mobility and/or saturation of oil in situ in the rock reservoir. Of these enhanced recovery techniques, EOR-$CO_2$ can be highlighted, which consists of injecting $CO_2$ into the reservoir, and chemical EOR, which consists of injecting solutions of surfactants, micro-emulsions, or aqueous solutions of polymers such as polyacrylamide, or xanthan (injection of these solutions of polymers is known as polymer flooding).

One of the problems is the optimization of EOR operations so as to produce a maximum of oil in situ in the reservoir.

Treatment of Water in Fields with Chemical EOR

When hydrocarbons are recovered, water is also produced, either that which was initially present in the subterranean formation, or that which has been injected. The recovered water might be polluted with the various injected additives. As a consequence, this water might be unsuitable for re-use or for discharging into the environment, into a natural reserve of water. For this reason, water treatment operations are provided to depollute the water produced. These operations are complex and expensive.

Process for the Production of Source Rock Oil and Gas

Production of these unconventional oils necessitates fracturing of the source rock. The most commonly used technique is hydraulic fracturing. Hydraulic fracturing consists of pumping a fluid containing various additives (solid particles known as proppants, polymers—polyacrylamide, etc—clays, etc) under very high pressure in order to crack the rock. During hydraulic fracturing operations which are poorly controlled, it is possible for the fluids used for fracturing to rise and cause pollution.

Well Drilling Process

In order to drill a well, a fluid is injected which fulfils four functions, namely: lifting the rock cuttings, keeping the cuttings in suspension when circulation stoppages occur, maintaining the pore pressure above the formation as well as cooling and lubricating the drilling tool. The drilling fluid contains several additives in order to fulfil these four functions, such as viscosifying agents, lubricants, anti-foaming agents, fluid loss control agents, etc. The dose of each of the additives for the drilling fluid formulation is optimized so that this formulation has the desired properties. The additives may be either organic molecules such as polymers, copolymers, associative polymers, or surfactants, or inorganic particles (clays, barite, etc). However, a variation in the concentration of additive(s) results in the drilling fluid no longer fulfilling the functions mentioned above. On the drilling platform, an individual is tasked with constantly checking that the drilling fluid properties comply with the initial specifications. In this regard, it may be of advantage to provide a method which can instantaneously determine, even in-line, the concentration of certain additives contained in the drilling fluid once it has been lifted to the surface.

Flow Assurance Process

A process of this type ensures the flow of hydrocarbons in the subterranean formation by injecting a fluid comprising additives which optimize the flow, for example anti-scale additives, anti-corrosion additives and anti-hydrate additives. Examples of anti-scale additives are polymers (polyacrylates, polycarboxylates, etc).

A) First Application—Determination of a Property of the Subterranean Formation

In accordance with a first application of the development process in accordance with the invention, the additive or additives labelled with at least one luminescent semiconductor nanocrystal may be used as tracer(s) to monitor the injection of a fluid into a subterranean formation in order to deduce the properties of this porous geological formation (in terms of permeability, for example) therefrom with the aim of optimizing its development. Thus, the optical analysis carried out can be used to determine at least one property of the subterranean formation. The properties which are determined are in particular selected from the petrophysical properties (permeability, porosity), the identification of preferential pathways, or preferential channels, etc. Knowledge of these properties in particular means that the processes for developing the subterranean formation, such as enhanced recovery processes, and processes for the production of source rock oil and/or gas, can be adapted.

In accordance with a first example, in the context of enhanced oil recovery, the injection of additives (in particular polymers) grafted with luminescent quantum dots which act as tracers can be used to find out the paths taken by the solutions of polymers in the reservoir. This means that, for example, knowledge can be gained as to whether injection into a well of this type is effective or not, during their detection at the surface (during their back-production). The information supplied by these additives labelled with luminescent quantum dots can also be used to optimize the fluid injection operations: as an example, by modifying the injection pressures, by transforming an injection well into a producing well or vice versa, etc. In addition, this information regarding the productivity of the various wells can be used to update, and to reset the reservoir models so as to optimize the recovery rates from the fields under production by means of reservoir simulations.

In accordance with a second example, the process for determining a property of the subterranean formation is adapted to a process for the production of rock source oil and gas in which the development process is carried out by injecting a fracturing fluid. In the process in accordance with the invention, a fluid recovered from an aquifer of the subterranean formation is recovered and analysed. Thus, it is possible to determine the presence and/or quantity of aquifer-polluting additive. In fact, in the formulation for the fracturing fluids, the use of additives labelled with luminescent semiconductor nanocrystals means that the presence of these additives in the aquifer-polluting additive can easily be detected. Thus, it is possible to monitor the quality of the aquifers and whether they are polluted.

In order to produce rock source oil and gas, the invention can also be used to identify the well or wells responsible for a leak by injecting additives labelled with luminescent semiconductor nanocrystals emitting at a characteristic wavelength for each well, or even with a colour code specific for each well by grafting different sizes of luminescent semiconductor nanocrystals.

As an example, it may be imagined that it would be possible to identify which operator is at the origin of a leak by injecting additives grafted with semiconductor nanocrystals with a colour code specific to each operator.

In addition, to monitor the integrity of the aquifers and the ground water located above a reservoir of source rock hydrocarbons, the monitoring authorities can, using the process in accordance with the invention, impose the use of fracturing fluids comprising at least one additive (ideally a plurality of additives of different chemical natures) labelled with luminescent semiconductor nanocrystals so as to be in a position to be able to rapidly detect any pollution by identifying the well (and thus the operator) responsible for the leak.

Advantageously, including compounds labelled with luminescent semiconductor nanocrystals in the formulation for the fracturing fluids where it is known that they will diffuse faster or as quickly as the other components may also be envisaged: compounds of this type may be used for the early detection of a leak and to highlight a disruption in the integrity of a field.

Another advantage of the use of additives comprising luminescent semiconductor nanocrystals resides in the fact that these additives may be detected in situ by sensors installed in the aquifers, ground water to be monitored: these sensors use the fact that the semiconductor nanocrystals fluoresce or phosphoresce when they are excited by radiation.

B) Second Application—Optimization of Development

In accordance with a second application of the development process in accordance with the invention, the additive or additives labelled with at least one luminescent semiconductor nanocrystal is/are used to optimize the development of a subterranean formation. Analysing the semiconductor nanocrystals can be used to detect and/or quantify the presence of additive in the recovered fluid. Consequently, the application for optimization of the developing comprises at least one supplemental step which may be:

a step for adaptation of the injected fluid, in particular by adjusting the composition and/or concentration and/or the type and/or the nature and/or the flow rate, etc, for example of additive, of the fluid injected in real time, and/or a step for treatment of the recovered fluid, which may be a step for treatment of the water produced.

This supplemental step is carried out as a function of the presence and/or the quantity of luminescent semiconductor nanocrystals in the recovered fluid.

In accordance with one exemplary embodiment of the invention, the present invention may be applied to a process for enhanced oil recovery, employing the development process as described above in order to determine the presence of additive in the water produced, and employing a step for treatment of the water when the additive is present in the water produced. Thus, it is possible to employ the most suitable water treatment techniques for the treated water in order to comply with environmental standards, which means that the costs of treatment of the water can be reduced and the quality of the water treatment can be monitored. In addition, this means that the additives in the treated water can be detected, identified and determined in order to adapt the water treatment techniques used, and thus to avoid employing techniques which are too expensive and not of use from a technical and/or an environmental viewpoint.

In accordance with an exemplary embodiment which relates to an enhanced oil recovery process, the optimization process in accordance with the invention can be used to adjust, in real time, the quantity, the nature etc, of the additives (polymers, surfactants, etc) in the enhanced recovery fluid. In fact, depending on the presence and/or the quantity of additives in the recovered fluid, it is possible to determine the conditions for enhanced recovery in order to optimize the production of hydrocarbons.

In accordance with an exemplary embodiment relating to drilling a well in a subterranean formation, the optimization process in accordance with the invention can be used to adjust, in real time, the quantity, the nature, etc of the additives in the drilling fluid. In fact, for the well drilling process, a drilling fluid is injected which comprises at least one additive, in particular viscosifying agents, fluid loss control agents, etc. As an example, the additives may be polymers (in particular a partially hydrolysed polyacrylamide, denoted HPAM), surfactants, organophilic clay molecules, clay particles (bentonite), etc. During drilling, it is important to readjust the concentrations of additives in order to provide the drilling fluids with good properties. The drilling process in accordance with the invention employs a development process as described above. The injection development process can be used to determine the concentration of additive after the drilling fluid has returned to the surface. Thus, the process in accordance with the invention can be used to determine the concentration of additives of the drilling fluid and to readjust the concentration of these additives in the drilling fluid.

Furthermore, in accordance with an exemplary embodiment relating to the production of source rock oil and/or gas, the fluid produced in a production well may be recovered and analysed. In fact, after hydraulic fracturing, as the well is being brought into production, a portion of the fracturing fluid is recovered. The use of additives labelled with fluorescent semiconductor nanocrystals, in particular viscosifying polymers (hydroxypropylguar, HPG or carboxymethyl-hydroxypropyl-guar, CMHPG), means that they can readily be determined in the recovered water. Furthermore, the invention can be used to monitor the quality of the water in subterranean formations below the source rock being developed. To this end, additives labelled with luminescent semiconductor nanocrystals can be incorporated into the fluids used (as fracturing fluids). The use of additives of this type means that the presence and/or the quantity of additives in subterranean formations (aquifers, ground water) can be determined in which these additives are not supposed to be present. The invention can thus be used to detect leaks generated during hydraulic fracturing of source rock.

In accordance with an example relating to the flow assurance process, by injecting a fluid with additive into the subterranean formation, the present invention can be used to determine the presence and/or the quantity of these additives in the effluent produced. This determination can then be used to adjust the quantity, the nature etc of the additives added to the injected fluid in real time.

The invention claimed is:

1. A process for developing a subterranean formation by an enhanced oil recovery process, in which at least one fluid is injected into the subterranean formation, the injected fluid comprising at least one additive, wherein the following steps are carried out:
   a) at least one additive is labelled with a luminescent semiconductor nanocrystal;
   b) the fluid comprising the labelled additive is injected into the subterranean formation in the enhanced oil recovery process;
   c) at least one fluid is recovered from the subterranean formation;
   d) the presence and/or quantity of the additive labelled with the luminescent semiconductor nanocrystal in the recovered fluid is optically analysed, wherein the recovered fluid comprises water, and
   e) a step for treatment of the water produced by the enhanced oil recovery process as a function of the quantity of additive present in the water.

2. The process according to claim 1, in which the additive is labelled with the luminescent semiconductor nanocrystal by grafting the luminescent semiconductor nanocrystal onto the additive, or by incorporating the luminescent semiconductor nanocrystal into the structure of the additive, or by coating the additive with the luminescent semiconductor nanocrystal in a coating layer.

3. The process according to claim 1, in which the luminescent semiconductor nanocrystal comprises a material selected from zinc sulphide (ZnS), zinc oxide (ZnO), cadmium sulphide (CdS), zinc selenide (ZnSe), cadmium sulphide (CdS), cadmium selenide (CdSe), cadmium telluride (CdTe), lead sulphide (PbS), lead telluride (PbTe), lead selenide (PbSe), $CuInSe_2$, $CuInS_2$, CdSeTe, CdHgTe, and $ZnS/Zn_{1-x}Cd_xS$, zinc sulphide doped with manganese (ZnS:Mn), zinc sulphide doped with europium (ZnS:Eu), calcium sulphide doped with europium (CaS:Eu), strontium sulphide doped with europium (SrS:Eu), strontium sulphide doped with europium and dysprosium (SrS:Eu,Dy), and strontium sulphide doped with europium and copper (SrS:Eu,Cu).

4. The process according to claim 1, in which the luminescent semiconductor nanocrystal is in the form of a semiconductor core coated with at least one semiconductor shell.

5. The process according to claim 4, in which the luminescent semiconductor nanocrystal is in the form of a multi-shell nanocrystal the composition of which is selected from CdSe/CdS/ZnS, CdSe/ZnSe/ZnS and InP/ZnS.

6. The process according to claim 1, in which the luminescent semiconductor nanocrystal is composed of three atomic elements belonging to columns I, III and VI of the periodic table.

7. The process according to claim 1, in which the composition of the luminescent semiconductor nanocrystal is selected from zinc sulphide doped with manganese (ZnS:Mn) and zinc sulphide doped with europium (ZnS:Eu).

8. The process according to claim 1, in which the luminescent semiconductor nanocrystal is substantially spherical, nanocylindrical or nanoplatelet in shape.

9. The process according to claim 1, in which the additive is a polymer, a copolymer or a surfactant.

10. The process according to claim 1, in which the additive is an inorganic compound such as a clay mineral, barite or a metallic oxide.

11. The process according to claim 1, in which the additive is an anti-scale additive or an anti-corrosion additive or an anti-hydrate additive.

* * * * *